US005391870A

United States Patent [19]

Purser

[11] Patent Number: 5,391,870

[45] Date of Patent: Feb. 21, 1995

[54] HIGH-SPEED PRECISION MASS SELECTION SYSTEM

[75] Inventor: Kenneth H. Purser, Lexington, Mass.

[73] Assignee: High Voltage Engineering Europa B.V., Amersfoort, Netherlands

[21] Appl. No.: 115,878

[22] Filed: Sep. 1, 1993

[51] Int. Cl.[6] ............................................ H01S 49/26

[52] U.S. Cl. .................................. 250/298; 250/299; 250/300

[58] Field of Search ............... 250/281, 294, 298, 299, 250/300

[56] References Cited

U.S. PATENT DOCUMENTS

| | | | |
|---|---|---|---|
| 3,641,339 | 2/1972 | McCormick | 250/298 |
| 3,648,047 | 3/1972 | Bushman et al. | 250/300 |
| 3,800,151 | 3/1974 | Hull et al. | 250/299 |
| 3,924,124 | 12/1975 | Favre et al. | 250/288 |
| 4,037,100 | 7/1977 | Purser | 250/281 |
| 5,086,227 | 2/1992 | Toita et al. | 250/299 |

FOREIGN PATENT DOCUMENTS 60-059648 4/1985 Japan ........................ 250/299

OTHER PUBLICATIONS

Elmore, D. and Phillips, F. M., "Accelerator Mass Spectrometry", Science, vol. 236, pp. 543–550 (1987).

Purser et al., "Ultra-Sensitive Product Identification Systems", *Nuclear Instruments & Methods*, vol. 162 (1979), pp. 637–656.

*Primary Examiner*—Jack I. Berman
*Assistant Examiner*—James Beyer
*Attorney, Agent, or Firm*—Nields & Lemack

[57] ABSTRACT

Compact and economical apparatus for use in accelerator mass spectrometry for mass selection and attenuation of each isotope by a predetermined fraction that is necessary to permit isotope sequencing through the accelerator stage, by a rotating shutter whose attenuation characteristics are defined by its mechanical shape.

15 Claims, 6 Drawing Sheets

HIGH-SPEED PRECISION MASS SELECTION SYSTEM

BACKGROUND OF THE INVENTION

1. Field of the Invention

This invention relates to Accelerator Mass Spectrometry wherein stable and radioactive isotopes of an element can be successively designated for measurement using a high speed isotope selector. The process allows precision isotopic ratios between stable and rare isotopes to be measured continuously. Although limitations in scope are not intended, this invention has particular relevance to the fields of nuclear waste disposal and the detection of clandestine nuclear reactor operations, the detection of trace elements in medicine and cosmogenic age determinations.

2. Description of the Prior Art

The principles of Accelerator Mass Spectrometry (AMS) have been described in detail by a number of authors who have presented ways in which AMS technique can be applied to the detection of very rare isotopes, such as $^{10}B$, $^{14}C$, $^{26}Al$, $^{36}Cl$, etc. Such descriptions include, for example, U.S. Pat. No. 4,037,100 to K. H Purser; Purser, K. H., Litherland, A. E., and Gove, H. E. "Ultra-sensitive particle identification systems based upon electrostatic accelerators", *Nuclear Instruments and Methods* volume 162, page 637 (1979); and Elmore, D. and Phillips, F. M., "Accelerator Mass Spectrometry", *Science* volume 236, page 543 (1987) For many rare nuclei it is routine for the detection limits to be between $10^{-12}$ and $10^{-16}$ compared to the concentration of the elemental stable isotopes. These ratios indicate as much as six orders of magnitude greater sensitivity than is possible using conventional mass spectrometry.

Measurement of isotopic ratios

In order to determine isotopic ratios accurately it is desirable that at least one stable isotope of an element be measured at the high energy end of the accelerator simultaneously with the rare isotope. The importance of simultaneous measurements is that both isotopes are expected to have identical trajectories between ion source and the exit from the accelerator, and, thus, the efficiency of transmission through the AMS system will be comparable for both isotopes. Using such a procedure, transmission losses within the accelerator will be identical in first order, allowing isotopic ratios to be measured directly, and fractionation changes with time can be identified.

Accelerator limitations

While intense beam currents of the stable isotopes from the ion source are desirable for maximizing the detection rates for the rare species, most tandem accelerators are neither capable of continuously handling intense beams of more than ~10 microamperes or of accepting the large intensity fluctuations inherent in slow switching between rare and stable isotopes. Thus, it becomes necessary to attenuate the stable isotope beams by a definite fraction or alternatively to inject ions of the stable isotopes in very short pulses so that the natural electrical capacities of the accelerator maintain the internal voltages more or less constant.

Mass switching

Referring to FIG. 1, it can be seen that in a typical AMS injector the negative ions from the source 2 are energy analyzed using an electrostatic deflector 1, following which a suitable magnetic field carries out mass analysis by directing the wanted mass ions through the defining slits 6, discarding all others. For such a layout and using particles having a charge state of $1^-$, the selected ions satisfy the equation:

$$M \cdot E = K$$

where K is a constant which includes the magnetic field and the mass analyzer geometry, M is the mass of the selected ions and E is their kinetic energy. Thus, for a fixed magnetic field (i.e. K remains constant) the selected mass is given by:

$$M = K/E$$

Clearly, a range of masses can be selected at fixed field by modifying appropriately the energy of the ions within the magnetic field.

Referring again to FIG. 1 it can be seen that by applying appropriate voltages to the insulated magnet vacuum chamber 4 it is possible to change the energy of the ions locally within the magnetic field and select individual masses for injection without the necessity of rapidly changing the magnetic field—a procedure that eddy currents within the magnets within the magnetic steel can make difficult or even impossible. For Carbon-14, having an energy of 20 keV, the box voltages needed for selecting specific isotopes from the trio, $^{12}C$, $^{13}C$, $^{14}C$, are 3.33 kV, 1.54 kV and zero, respectively. Clearly, using the above mass selection scheme, only one isotope can be injected into the accelerator at a given instance, and it becomes necessary to time-share the accelerator with the rare isotopes being given more analysis time than the abundant isotopes.

Two issues must be carefully addressed to achieve precision ratio measurements: (i) The electric waveform applied to the vacuum chamber must be flat-topped and free from any overshoot and ringing that would cause the select mass beam to be partially intercepted as it passes through the mass defining aperture. (ii) To facilitate the calculation of isotopic ratios it is essential to know precisely the relative duration that each isotope is directed into the accelerator. For state of the art measurements this ratio should be known to about 1/1000.

Accelerator injection energies

While for some AMS systems 20 keV is a satisfactory injection energy, for the larger and older tandems where the optical admittance is smaller, higher injection energies are more appropriate and there are some systems operating at injection energies as high as 130 keV. Such elevated energies introduce practical difficulties for high speed mass switching, however, because, although the particle transmission of the spectrometer is improved, the switching voltages needed for mass selection increase with injection energy. As an example, at injection energies of 130 keV, switching between the carbon isotopes requires 21.6 kV for shifting from mass 14 to mass 12 and 10.0 kV to change from mass 14 to mass 13. In the important case of measuring concentrations of the long-lived $^{36}Cl$ isotope, the situation is somewhat less demanding: 7.4 kV for shifting from mass 37 to mass 35, and 3.6 kV for shifting from mass 37 to mass 36.

SUMMARY OF THE INVENTION

The present invention comprehends a compact and economical apparatus which carries out the tasks of producing flat-topped high voltage pulses for mass selection and the attenuation of each isotope by a predetermined fraction that is necessary to permit isotope sequencing through the accelerator stage. The task of attenuating each isotope is not carried out electrically but rather by a rotating shutter whose attenuation characteristics are defined by its mechanical shape.

The features of this invention are: (1) The mass selection voltages which must be applied to the magnet vacuum box need only have rise times of the order of milliseconds rather than a few microseconds, as is desirable for existing high speed mass switching devices. (2) Attenuation of each selected isotope is independent of the rise time of the mass-selection voltages and is achieved by translating an accurately machined slot across the beam path.

BRIEF DESCRIPTION OF THE DRAWINGS

Operation of the invention may best be understood from the following detailed description thereof, having reference to the accompanying drawings, in which.

DESCRIPTION OF THE PREFERRED EMBODIMENT

Figure 1:
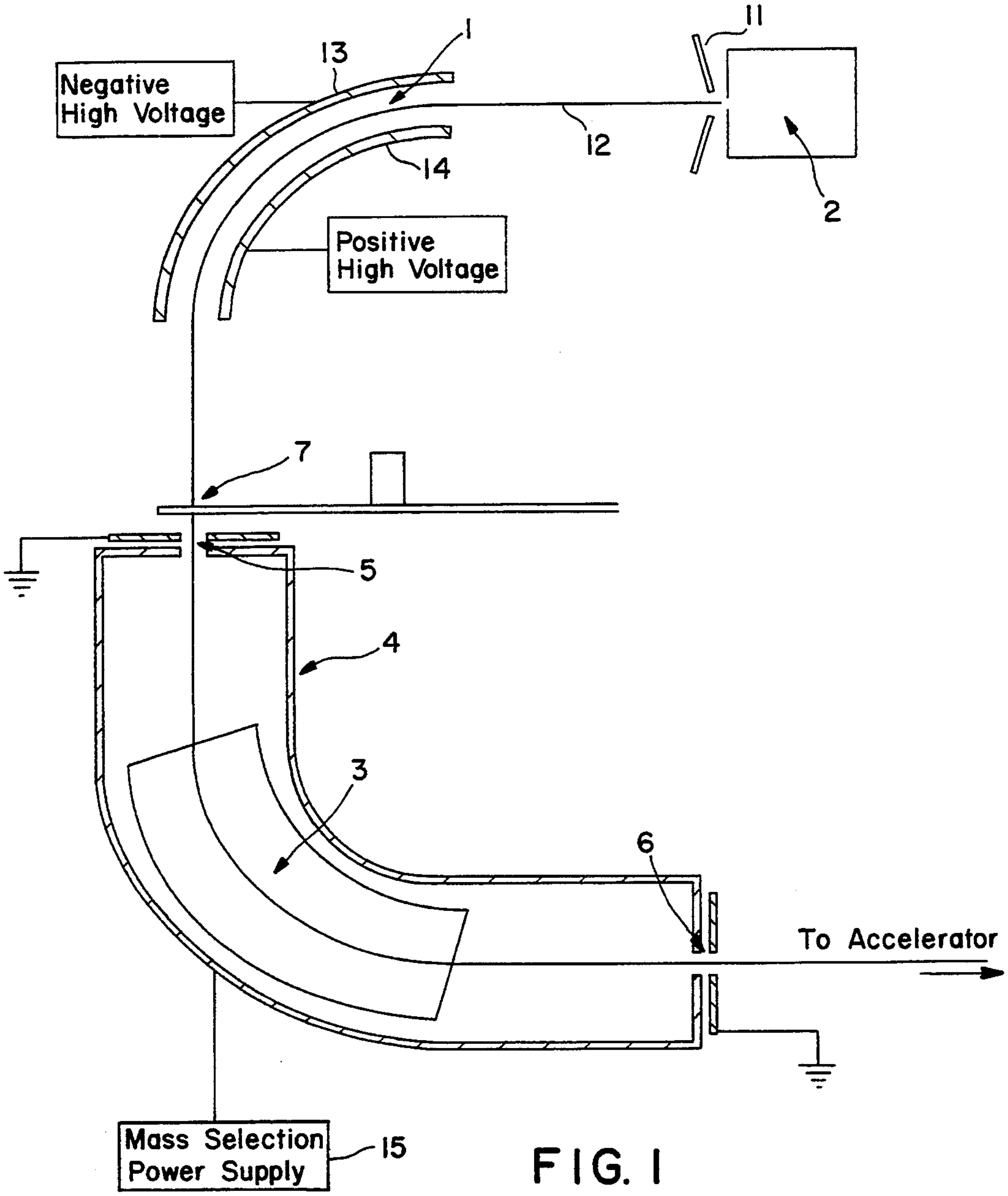
FIG. 1 is a diagram showing a typical injection system for an Accelerator Mass Spectrometer.

Referring to the drawings, and first to FIG. 1 thereof, therein is shown a typical mass selection system used with an AMS analysis system. Negative ions are produced in a negative ion source 2 and extracted by an extractor electrode 11 as a beam 12 of negative ions. The beam 12 is directed through an electrostatic bend 1 comprising an outer plate 13 maintained at negative high voltage and an inner plate 14 maintained at positive high voltage, so that the electrostatic field between the plates 13, 14 causes the beam 12 to follow the trajectory shown. The electrostatic bend 1, in cooperation with suitable beam-defining apertures (not shown), discards ions that leave the source 2 with incorrect energy. After passing through this electrostatic bend, the remaining ions in the beam 12 are directed through a magnetic deflector 3 which provides mass selection in cooperation with suitable beam-defining apertures (not shown). An electrically isolated vacuum chamber 4 is included as part of the magnetic deflection apparatus to allow the energy of the ions to be increased or decreased in the region of the magnetic deflector for high-speed mass switching; increasing the ion energy within the magnetic field permits lower mass ions to be directed through the mass defining slits, and decreasing the ion energy within the magnetic field permits higher mass ions to be directed through the mass defining slits. The energy variations needed for mass switching are introduced at gaps 5, 6 at the entry and exit conjugate focal points for the magnet. These energy variations are produced by the electric field across these gaps 5, 6, which in turn are produced by a mass selection power supply 15. The power supply 15 impresses a voltage on the vacuum chamber 4 which forms one side of each gap 5, 6, the other side being grounded as shown. In accordance with the present invention a beam shutter 7 is located before the object slits of the analysis magnet. The beam shutter 7 includes a rotating disc 16 and an interception plate 8, as shown in FIGS. 2 and 3.

Figure 2:
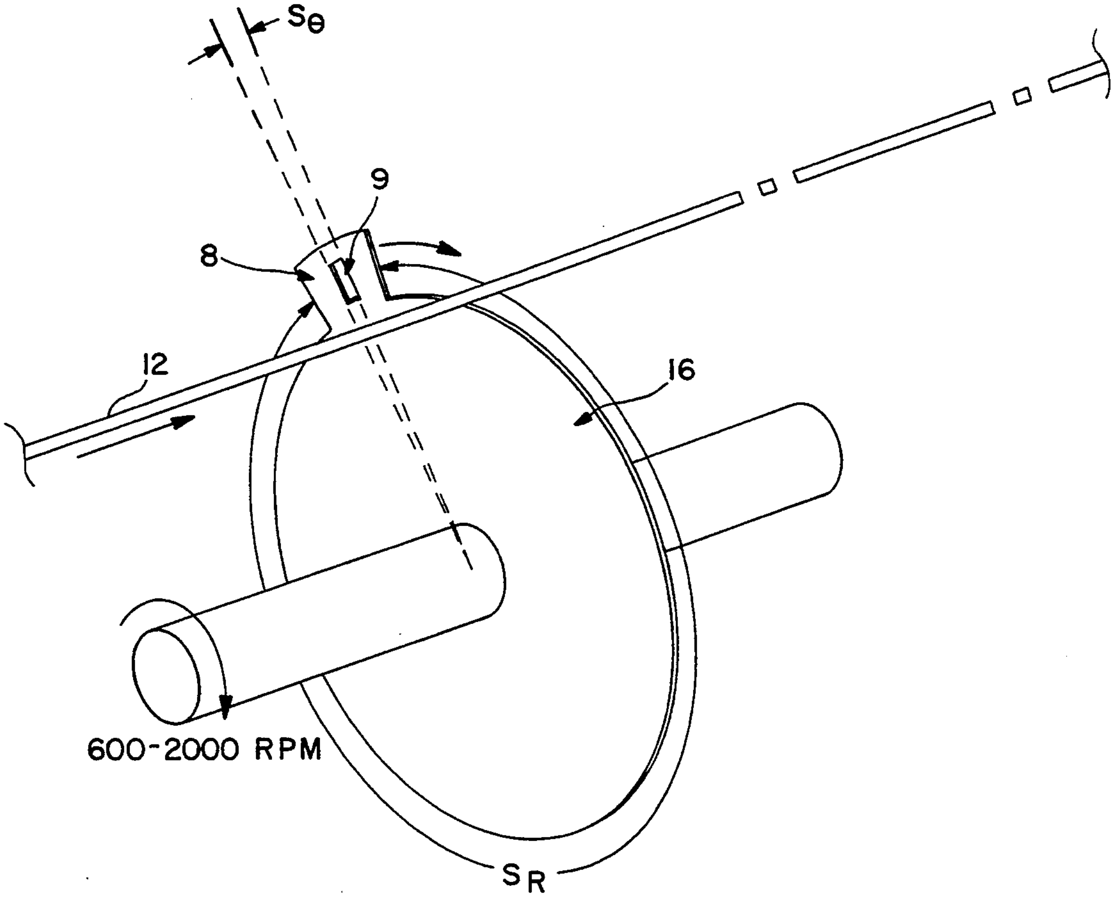
FIG. 2 is a schematic diagram showing the operation of the attenuator in accordance with the invention.
Figure 3:
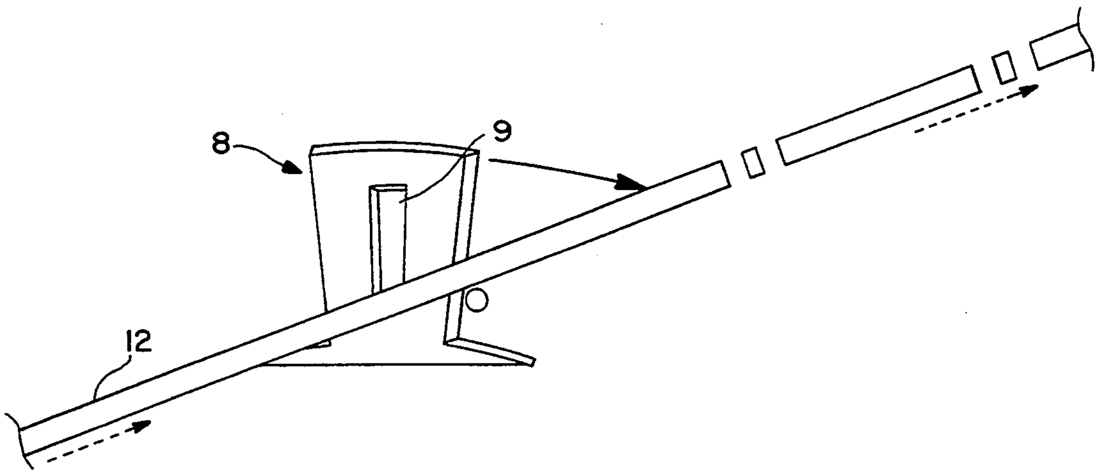
FIG. 3 is a diagram showing details of the interception plate (or shutter) of FIG. 2.

The operation of the shutter 7 of FIG. 1 is shown in the schematic diagram of FIG. 2, and FIG. 3 shows more details of the interception plate 8. Referring thereto, in the preferred embodiment of the invention the interception plate 8 is an extension of a disc 16 having a diameter of approximately 300–400 mm rotating uniformly at an angular velocity in the range 600–2,000 rpm. An interception plate 8 on the periphery of the wheel 16 intercepts the beam 12 once every revolution and prevents any ions from being directed into the AMS system until the potential of the magnet vacuum chamber has stabilized at the next needed value; in the preferred embodiment this "dead time" is of the order of 3 milliseconds. After voltage stability has been achieved, a sectored aperture 9 of angular width $S_\theta$, located in the center of the interception plate 8, traverses the beam allowing a defined burst of the electrically selected isotope to be transmitted to the accelerator. Following this the beam is again shut off by the second section of the interception plate 8, and the potential on the vacuum box is returned to the value appropriate for transmission of the rare isotope. The rare isotope is transmitted for the remainder of the revolution ($S_R$).

To those skilled in the art it will be clear that there are many techniques available for moving the above interception plate across the ion beam to produce the necessary dead times and wanted bursts of ions; linear motions and interrupted rotary motions are possibilities. While a rotating disc is the preferred embodiment it is not meant to represent a limitation in scope for the present invention.

It can be seen from FIG. 2 that the fractional transmission of ions of stable isotopes passing through the above slot is $S_\theta/360$, where $S_\theta$ is the angular slot width in degrees. Also, the fractional transmission of the wanted isotope can be seen to be $S_R/360$. Normally, $S_R$ is $>>S_\theta$ and, typically, the duty cycle for measurement of the rare isotope will be $\sim85\%$.

The attenuation ratio of stable/rare isotopes is independent of beam shape and wheel speed and is only contingent upon the ratio of the angular widths, $S_\theta/S_R$. As an example, if $S_\theta$ is 4 degrees and the speed of rotation 1,200 rpm, the burst duration will be 550 microseconds, and the transmission factor for the stable isotopes will be 1/90. Rotation speed is only important in as much as the charge in an individual burst must be sufficiently small that there is no significant change in accelerator voltages when each elementary pulse is injected; also the repetition period should be short compared to the RC time constants of the elements of the accelerator.

Figure 4:
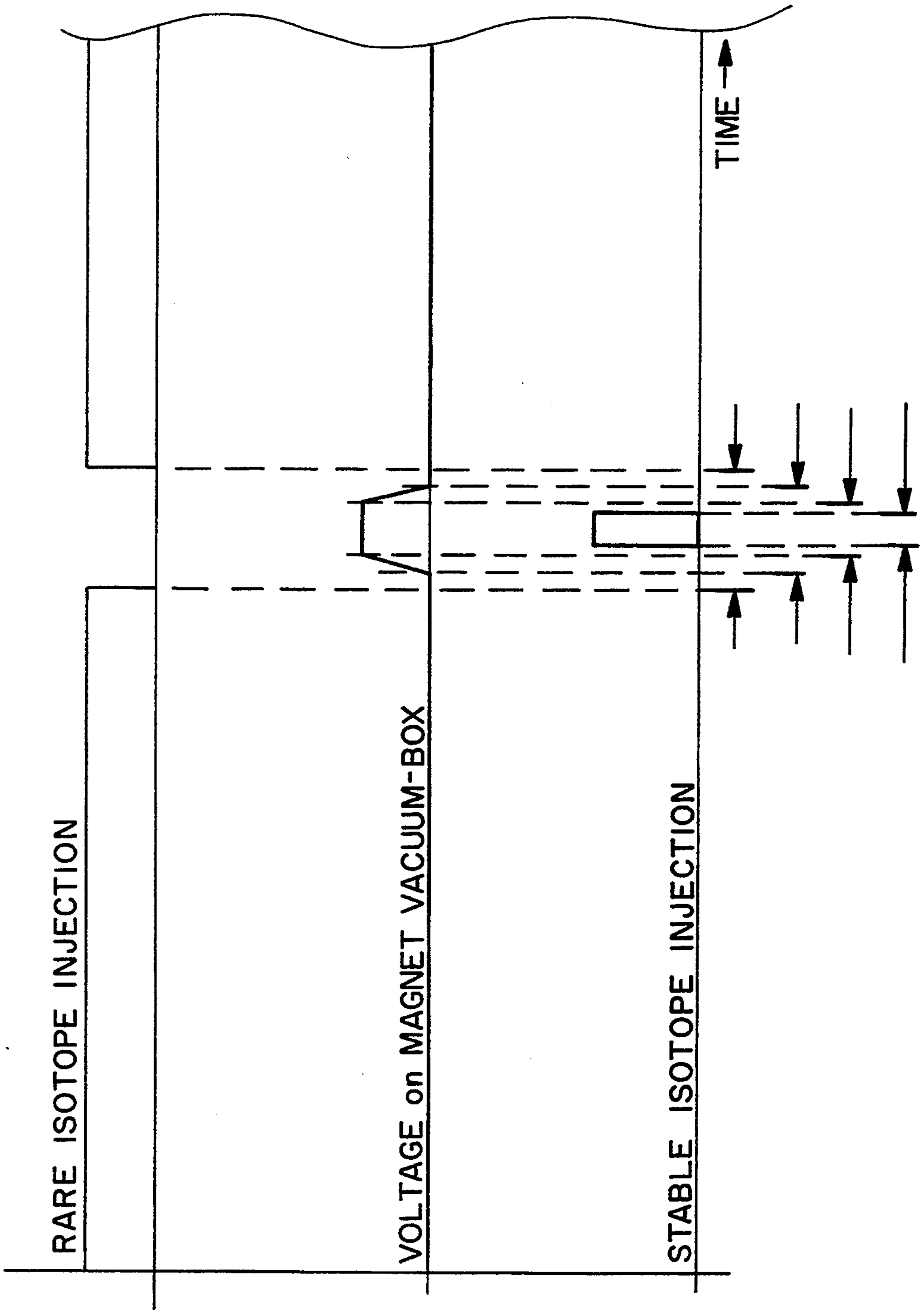
FIG. 4 is a schematic representation of the mass selection waveforms and the timing of the shutter of FIGS. 2 and 3 and the injected bursts.
Figure 5:
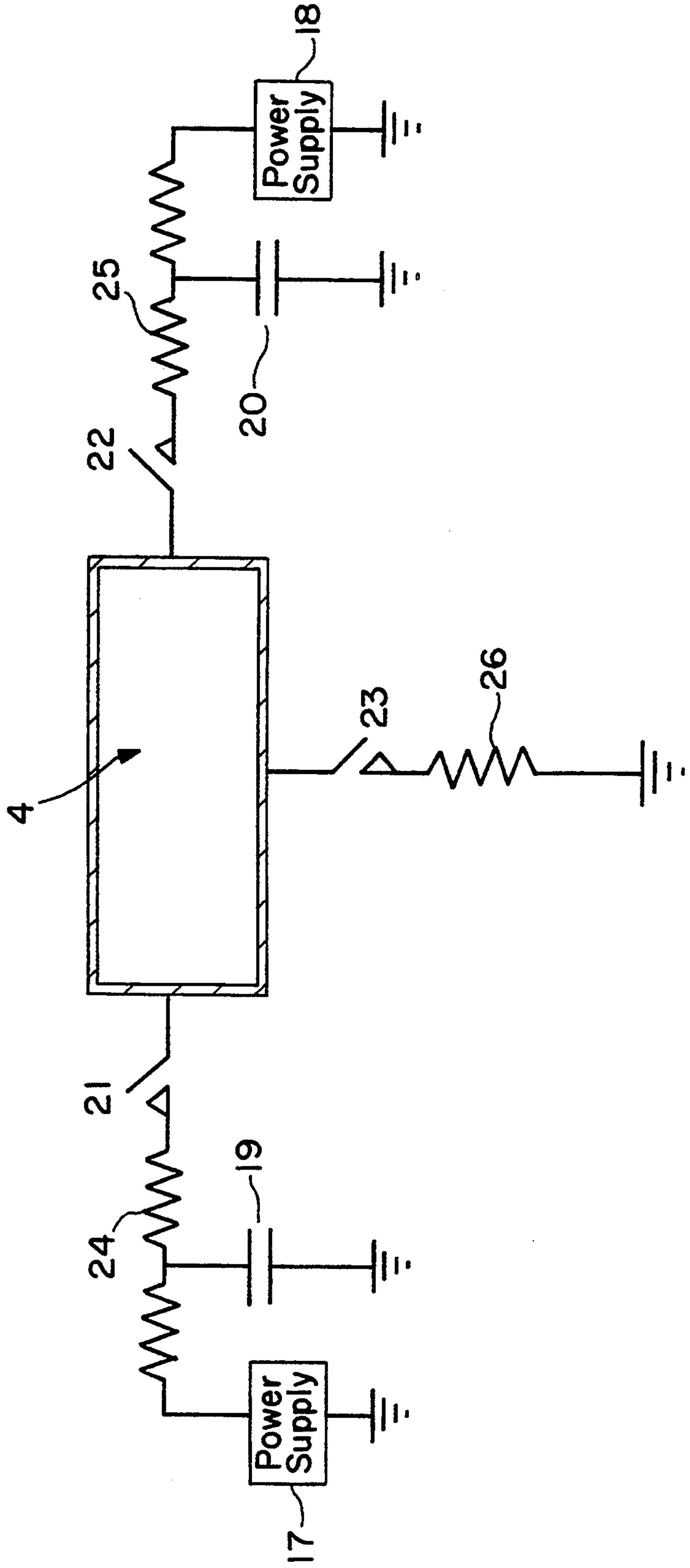
FIG. 5 is a schematic diagram showing a possible electrical switching arrangement for use with the apparatus of FIGS. 2 and 3.
Figure 6:
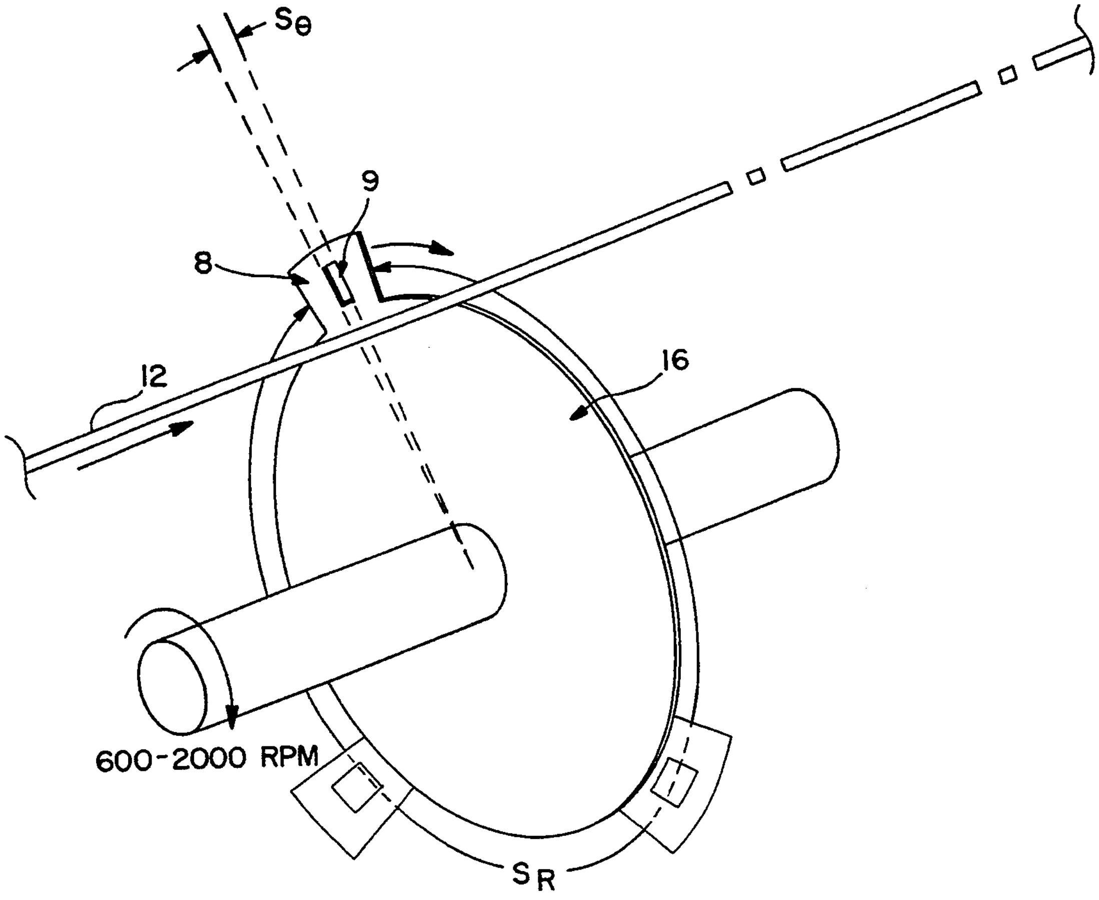
FIG. 6 is a schematic diagram similar to that of FIG. 2 and showing a disc which includes a multiplicity of radial extensions with central apertures, wherein the dimensions of each of the multiplicity of radial extensions and apertures differ.

Referring now to FIG. 4, therein is shown the timing of the shutter system of FIGS. 1–3. It can be seen that the necessary electrical rise times are relatively long. As an example, it is anticipated that the typical geometry of a vacuum box 4 will necessitate a capacity to ground of || 7500 pF (picofarads). Thus, if the isolated vacuum chamber 4 is switched to 3.6 kV through a resistor of 10 kilo-ohms, the voltage will have a rise-time of ~0.1 milliseconds. While there are many methods for producing such mass selection voltages, the preferred embodiment is shown in FIG. 5 and would use multiple independently controlled precision power supplies 17,18, each providing the appropriate voltage for injecting a specific isotope; a capacitor 19,20 (~0.05 microfarads) across each output would supply the instantaneous switching currents. In the case of elements with three isotopes of interest, two power supplies 17,18 will be needed. It can be seen that high voltage switches 21,22,23 connect the magnet vacuum box 4 to the appropriate power supply 17,18 or to ground. Because of the large series resistance 24,25,26 the selection voltages will be over-damped and become rapidly (<1 millisecond) flat-topped.

While this method can be adapted to isotopic ratio measurements for all elements, its application is instructive for detection of the long-lived isotope $^{36}$Cl. We make the following assumptions about the mass selection and AMS system: (i) A wheel attenuation factor of 1/50, (ii) A ratio measuring sequence for $^{36}$Cl of 36-35-36-37-36-35-36-37 etc., (iii) a 25-microampere beam of the mass-35 isotope at the injector, (iv) separate faraday cups for the mass-35 and 37 beams following the first post-acceleration analysis magnet. Using these parameters it can be shown that after acceleration through an 8 MV tandem the $^{35}Cl^{7+}$ beam will result in an average measurable current of ~0.1 microampere, with the other stable isotope, $^{37}Cl^{7+}$, providing currents of 0.03 microamperes It will be clear to those skilled in the art that currents of this magnitude are in a range which can be measured reliably by an appropriate charge or current monitor having time constants of the order 1 second.

By measuring both stable chlorine isotopes, $^{35}$Cl and $^{37}$Cl, several times per second it is possible to produce a continuous record of intensities and a stable isotopic ratio for $^{35}Cl/^{37}Cl$. Clearly, this measured ratio must be consistent with established mass spectrometric values if the $^{36}$Cl data is to be accepted, and it has been found that the stable isotope ratio provides a sensitive test of overall system health. It has been found that the technique also yields valuable information about the consistency of target quality, about variable losses within the accelerator and about the causes of marginal changes in fractionation from run to run.

Detector dead times

One practical difficulty which must be addressed in any sequential mass switching system is that when the intense bursts of the stable isotopes are transmitted through the shutter slot 9 unwanted particles may reach the final particle counter. These can add to backgrounds or dead times unless the counter is gated off during the duration of the burst. While the probability for any given particle reaching the sensitive volume of the detector is small, the flux of injected $^{35}$Cl is of the order of $3.10^{12}$/sec, so that, as a consequence of wall scattering or inadequate vacuum pressures, background rates can still be high compared to the anticipated $^{36}$Cl rates of a few/minute. While these background particles will not damage the detector or its entrance window, their passage into the detector may introduce backgrounds and undesirable dead times if the charge within the counter must be cleared before normal operation is again possible. In addition, $^{35}$Cl and $^{37}$Cl of the same energy are difficult to distinguish from the wanted $^{36}$Cl on the basis of E & dE/dx measurements.

To avoid these problems, an optional second shutter can be added following the accelerator. This shutter might be similar in construct to that described previously and shown previously in FIG. 2, but without the narrow slot in the center of the interception plate 8. The rotor of this auxiliary shutter would be slaved to the primary shutter, so that when high intensity stable isotopes are injected, particles of all types are excluded from the detector. It will be clear to those skilled in the art that the necessary synchronization can be achieved in a variety of ways.

Having thus described the principles of the invention, together with illustrative embodiments thereof, it is to be understood that, although specific terms are employed, they are used in a generic and descriptive sense, and not for purposes of limitation, the scope of the invention being set forth in the following claims.

I claim:

1. That method of selecting particles of a certain mass from a beam of charged particles comprising the following steps:
   (1) directing said beam between the pole faces of a deflection magnet,
   (2) periodically modifying the energy of said charged particles prior to arrival at the region between said pole faces,
   (3) reversing said energy modification after said charged particles leave the region between said pole faces, and
   (4) intercepting said beam by a mechanical shutter during the change of parameters required for initiation of said modification and reversal thereat.

2. A mass selection system which directs charged particles into an accelerator mass spectrometer and final particle detector, comprising in combination:
   (1) a magnet having pole faces and being adapted to produce a magnetic field between said pole faces,
   (2) a defining aperture,
   (3) means for producing a beam of high speed charged particles having different masses one of which is a specified mass to be detected and for directing said beam through said magnetic field and thence toward said defining aperture,
   (4) a metallic vacuum envelope within said magnetic field, said vacuum envelope being electrically insulated from said pole faces,
   (5) a high voltage power supply connected to said metallic vacuum envelope, said power supply being capable of switching between selected voltage levels, and
   (6) a first shutter located in the path of said beam prior to said magnetic field, said shutter consisting of two regions which prevent transmission of said beam separated by a slot aperture which allows tranmission of a burst of said charged particles.

3. A mass selection system in accordance with claim 2, wherein said magnetic field is terminated by non-normal field boundaries at locations within the said magnetic field where the said high speed particles enter and exit the said magnetic field.

4. A mass selection system in accordance with claim 2, wherein said magnetic field is approximately uniform within the field boundaries.

5. A mass selection system in accordance with claim 3, wherein said magnetic field is approximately uniform within the field boundaries.

6. A mass selection system in accordance with claim 2, wherein said high voltage power supply includes (a) a multiplicity of independent d.c. voltage sources, the output voltage from each being set at a selected voltage level and (b) individual switches connecting each independent d.c. voltage source to the said metallic envelope.

7. A mass selection system in accordance with claim 2, wherein said first shutter is in the form of a disc which rotates about an axis normal to the plane of the disc.

8. A mass selection system in accordance with claim 7, wherein said disc includes a single radial extension with central aperture.

9. A mass selection system in accordance with claim 8, wherein said radial extension is of a dimension that it intercepts the high speed charged particles once every revolution.

10. A mass selection system in accordance with claim 8, wherein the non-circumferential boundaries to the said radial extension and the said aperture coincide with radial lines which pass through the axis of rotation.

11. A mass selection system in accordance with claim 7, wherein said disc includes a multiplicity of radial extensions with central apertures.

12. A mass selection system in accordance with claim 11, wherein the dimensions of each of the multiplicity of radial extensions and apertures differ.

13. A mass selection system in accordance with claim 12, wherein the second shutter is in the form of a disc which rotates about an axis normal to the plane of the disc, said disc including a radial extension without central slot.

14. A mass selection system in accordance with claim 2, wherein said first shutter is supported by a rotary actuator which moves that shutter across the beam of high speed charged particles.

15. A mass selection system in accordance with claim 2, wherein said first shutter is supported by a linear actuator which moves that shutter across the beam of high speed charged particles.

* * * * *